United States Patent
Nishida et al.

(10) Patent No.: US 8,589,040 B2
(45) Date of Patent: Nov. 19, 2013

(54) VEHICLE DRIVING-FORCE CONTROL DEVICE

(75) Inventors: Masayuki Nishida, Tokyo (JP); Hiroki Tanaka, Tokyo (JP); Takahito Morishita, Tokyo (JP); Keisuke Ajimoto, Tokyo (JP); Shinya Yasunaga, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/323,531

(22) Filed: Dec. 12, 2011

(65) Prior Publication Data

US 2012/0166053 A1 Jun. 28, 2012

(30) Foreign Application Priority Data

Dec. 24, 2010 (JP) ................................. 2010-288321

(51) Int. Cl.
*G06F 7/00* (2006.01)
(52) U.S. Cl.
USPC .............................................. 701/52; 477/34
(58) Field of Classification Search
USPC ........................... 701/51, 52, 62; 477/34, 121
See application file for complete search history.

(56) References Cited

U.S. PATENT DOCUMENTS

| | | | | |
|---|---|---|---|---|
| 4,817,471 A * | 4/1989 | Tury | ................................ | 477/125 |
| 5,148,721 A * | 9/1992 | Anan et al. | ........................ | 701/53 |
| 5,406,861 A * | 4/1995 | Steeby | ......................... | 74/336 R |
| 6,502,652 B2 * | 1/2003 | Rogg | .......................... | 180/65.21 |
| 7,555,967 B2 * | 7/2009 | Terayama et al. | ............ | 74/336 R |
| 8,442,731 B2 * | 5/2013 | Unno | ................................ | 701/52 |
| 2007/0099751 A1 * | 5/2007 | Terayama et al. | ................ | 477/34 |
| 2007/0247975 A1 | 10/2007 | Masuda et al. | | |
| 2007/0255462 A1 * | 11/2007 | Masuda et al. | ...................... | 701/1 |
| 2007/0271026 A1 * | 11/2007 | Hijikata | ......................... | 701/103 |
| 2007/0299594 A1 | 12/2007 | Masuda et al. | | |
| 2008/0015767 A1 | 1/2008 | Masuda et al. | | |
| 2008/0015768 A1 | 1/2008 | Masuda et al. | | |
| 2008/0162012 A1 * | 7/2008 | Masuda et al. | ................. | 701/101 |
| 2008/0215217 A1 * | 9/2008 | Unno | ................................ | 701/54 |
| 2008/0300768 A1 * | 12/2008 | Hijikata | ......................... | 701/102 |

FOREIGN PATENT DOCUMENTS

| | | |
|---|---|---|
| JP | 2006-97789 A | 4/2006 |
| JP | 2006-200727 | 8/2006 |
| JP | 3872507 B1 | 1/2007 |

OTHER PUBLICATIONS

Notification of Reasons for Refusal dated Dec. 25, 2012.

* cited by examiner

*Primary Examiner* — Thomas Black
*Assistant Examiner* — Shardul Patel
(74) *Attorney, Agent, or Firm* — McGinn IP Law Group, PLLC

(57) ABSTRACT

In a vehicle driving-force control device, if a primary speed is not lower than or equal to a kick-down allowable speed and an accelerator pedal depression amount is larger than or equal to a kick-down allowable depression amount, a shift control device identifies an intention of acceleration from a driver's accelerator operation and kick down a gear stage to a lower stage, even in a manual shift mode having been selected. In this case, the kick-down allowable speed is set to a different value for each of driving force characteristic modes, and a speed range in which a kick-down operation is allowed to be automatically performed on the basis of the primary speed is set narrower for a driving force characteristic mode having higher responsiveness to an accelerator operation.

17 Claims, 11 Drawing Sheets

Mpe1

Mpe2

Mpe3

VEHICLE DRIVING-FORCE CONTROL DEVICE

CROSS-REFERENCE TO RELATED APPLICATIONS

The present application claims priority from Japanese Patent Application No. 2010-288321 filed on Dec. 24, 2010, the entire contents of which are hereby incorporated by reference.

BACKGROUND OF THE INVENTION

1. Field of the Invention

The present invention relates to a vehicle driving-force control device having a manual shift mode in controlling an automatic shift in which one of a plurality of preset gear stages can be manually selected.

2. Description of the Related Art

For a power train to be mounted on a vehicle, there have been many technologies are disclosed that provide a plurality of modes that generate different driving force characteristics in response to a driver's accelerator operation so that a running performance which values high fuel efficiency, a sporty driving or the like is achieved.

For example, Japanese Patent Publication No. 3872507 discloses a technology that sets, as driving force characteristics, a normal mode in which output torque substantially linearly changes with respect to an accelerator opening degree, a save mode in which engine torque is saved to achieve both ease of driving and fuel efficiency, and a power mode in which a particular value is placed on power and an excellent output characteristic in response is achieved across from a low engine speed range to a high engine speed range. Any one of these driving modes can be selected according to a driver's preference in response to an input operation from a shuttle switch disposed on a center console.

A continuously variable transmission is well known as an automatic transmission that constitutes a power train of this type. The continuously variable transmission has shifts modes including an automatic shift mode for automatically controlling a gear ratio according to a preset transmission characteristic as well as a manual shift mode for manually selecting one of a plurality of preset gear stages so as to shift to a specifically fixed gear ratio. In this case, the gear ratio is basically kept on a fixed gear ratio of a gear stage selected by a driver in the manual shift mode. In a case, for example, where an input speed of the continuously variable transmission exceeds a preset and fixed speed for automatic upshift/downshift, the gear stage is forced to be shifted up/down from a viewpoint of engine protection or the like.

In a driving force control device having the automatic transmission described above, however, the gear stage selected by the driver is maintained in a preset speed range for automatic upshifting/downshifting in the manual shift mode having been selected.

Thus, in the above-mentioned speed range, preset downshift is not performed even if the driver presses an accelerator pedal deeply and a kick-down switch is turned on. Accordingly, a shift operation is performed against the driver's intention.

SUMMARY OF THE INVENTION

The present invention has been made in view of the above problem. It is an object of the present invention to provide a vehicle driving-force control device that suitably maintains a gear stage selected by a driver in a manual shift mode and performs automatic shifting as necessary in agreement with a driver's intention without causing a sense of discomfort.

An aspect of the present invention provides a vehicle driving-force control device that has an automatic shift mode in which a gear ratio or a gear stage is automatically controlled according to a preset shift characteristic and a manual shift mode in which one of a plurality of gear stages can be manually selected for controlling an automatic transmission constituting a power train. The vehicle driving-force control device includes an automatic downshift control unit for automatically changing a current gear stage to a lower gear stage in the manual shift mode having been selected if an input speed of the automatic transmission is lower than or equal to a preset kick-down allowable speed and if an accelerator pedal depression amount reached by a driver is larger than or equal to a preset kick-down allowable depression amount. The kick-down allowable speed is set to a different value for each of the driving force characteristic modes in the automatic downshift control unit.

DESCRIPTION OF THE PREFERRED EMBODIMENTS

Figure 1:
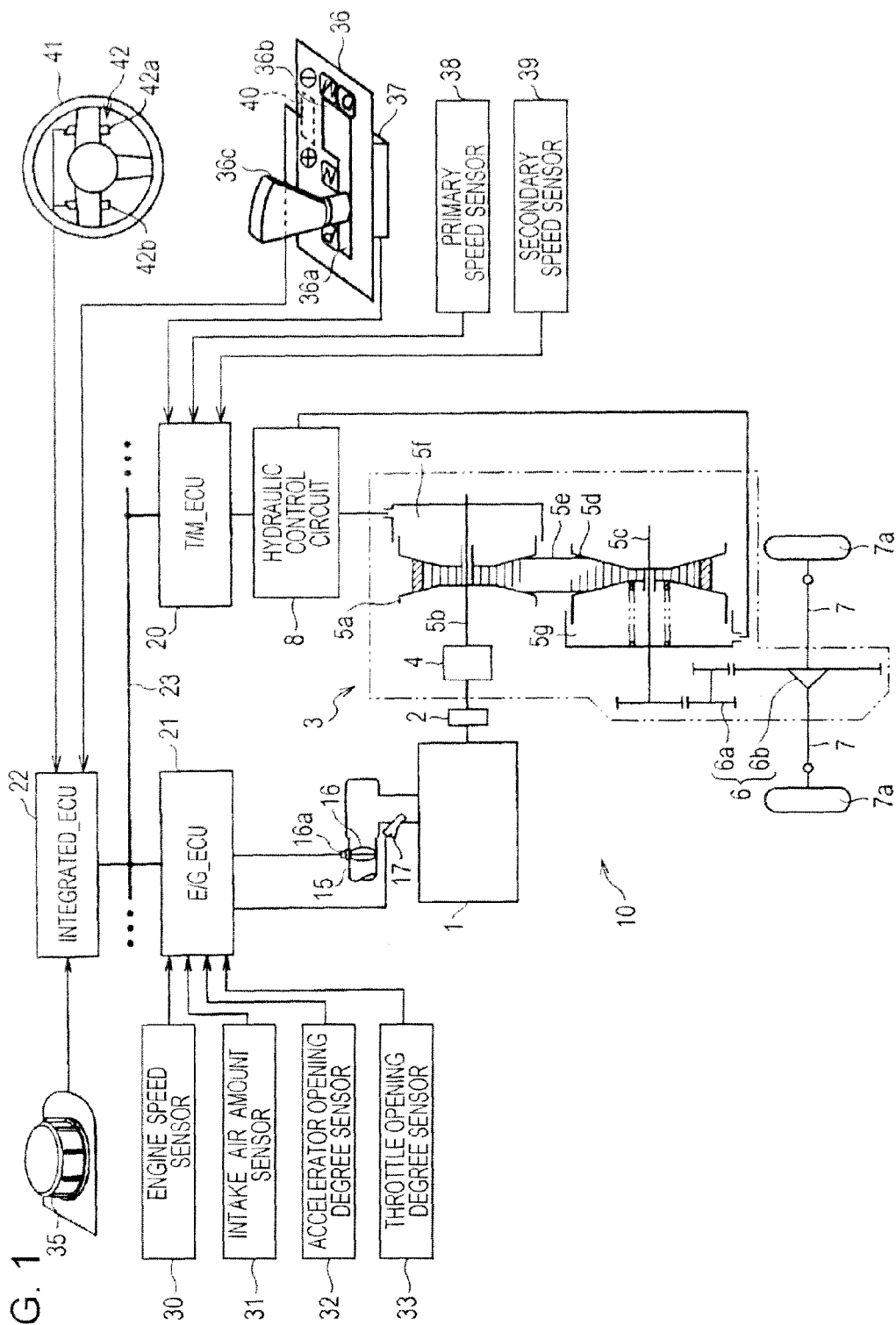
FIG. 1 is a schematic block diagram of a power train mounted in a vehicle.
Figure 2A:
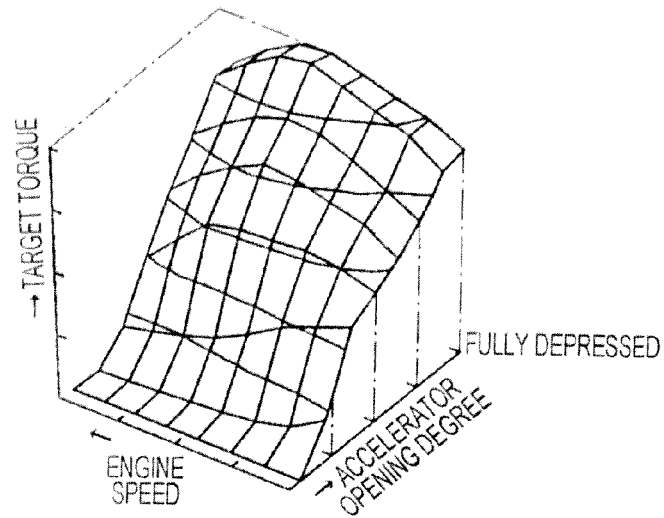
FIGS. 2A to 2C each conceptually show a normal mode map, a save mode map and a power mode map.
Figure 2B:
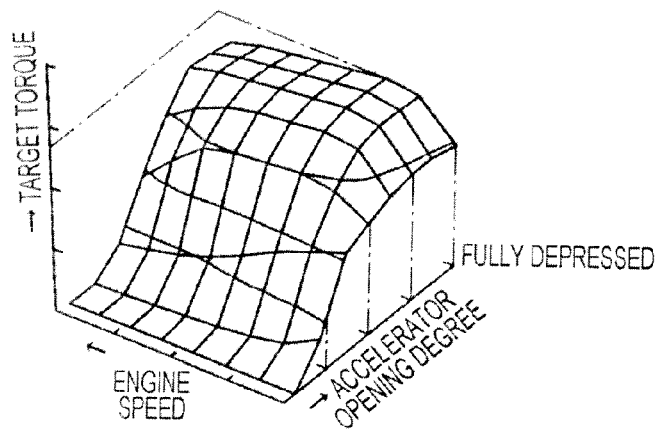
Figure 2C:
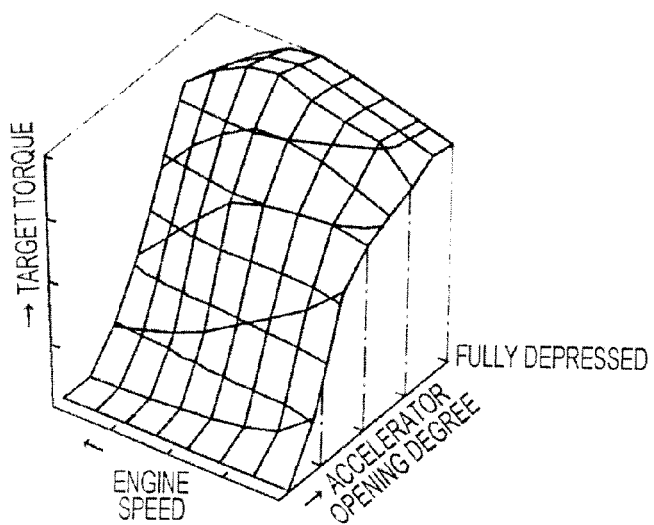
Figure 3:
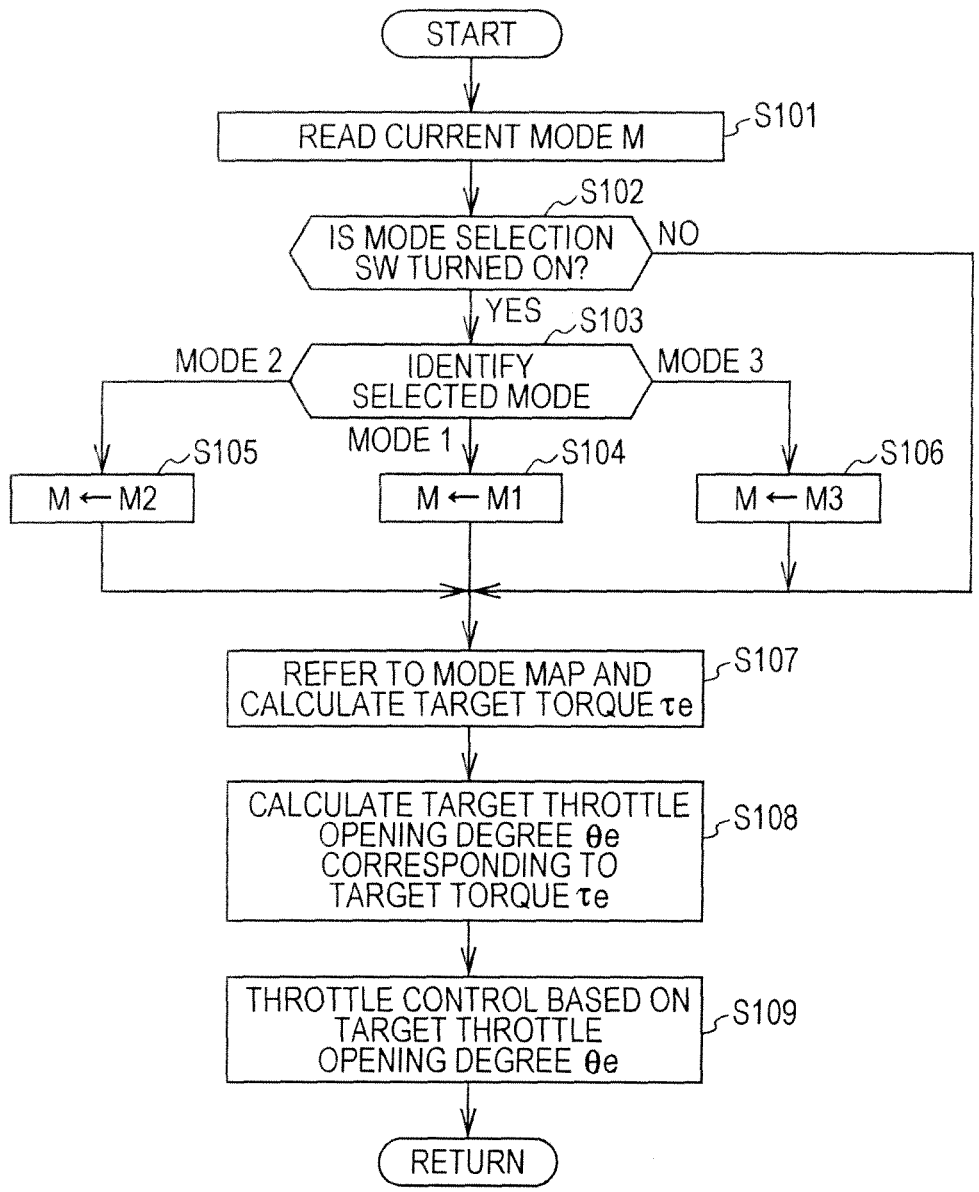
FIG. 3 is a flowchart showing a throttle control routine of an engine.
Figure 4:
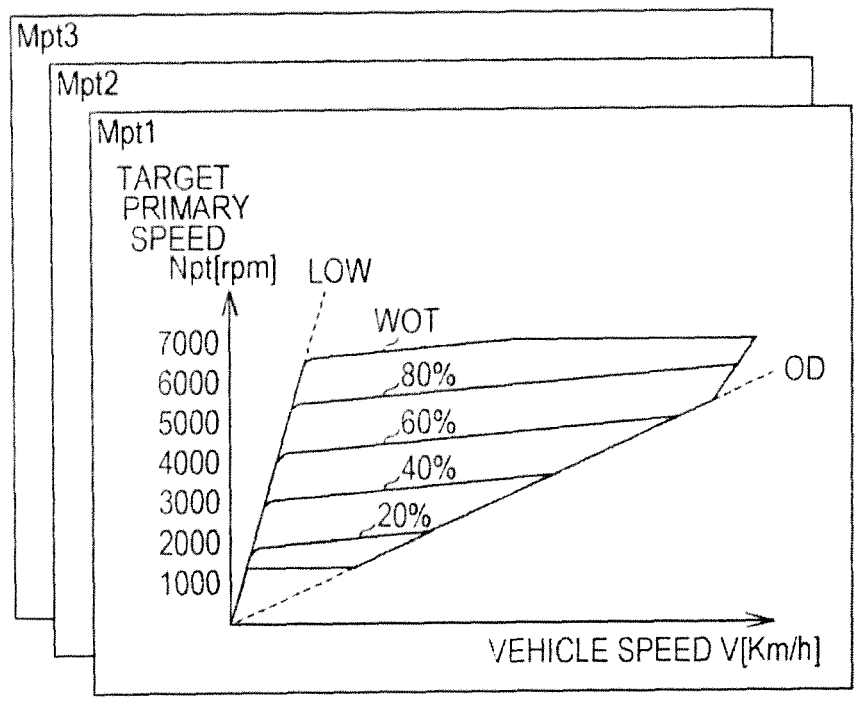
FIG. 4 is a conceptual diagram illustrating an automatic shift map.
Figure 5:
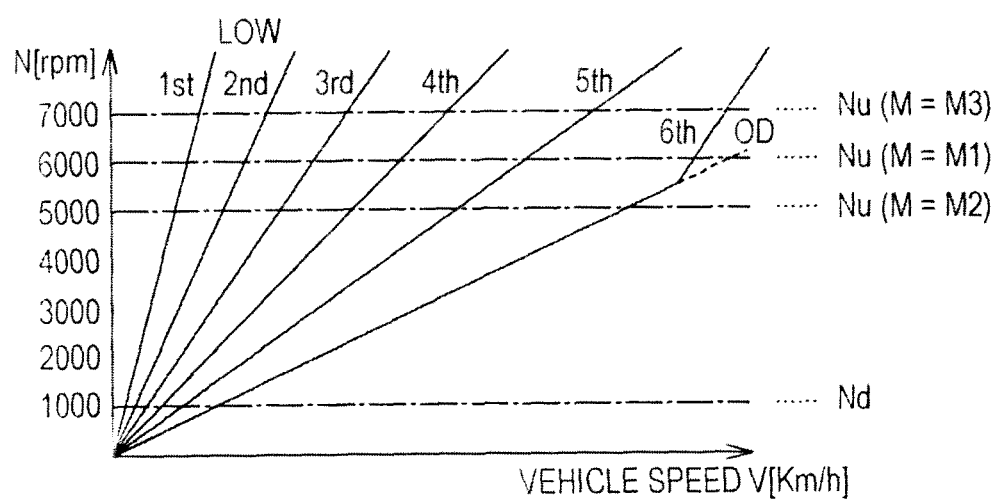
FIG. 5 is a conceptual diagram illustrating a manual shift map.
Figure 6:
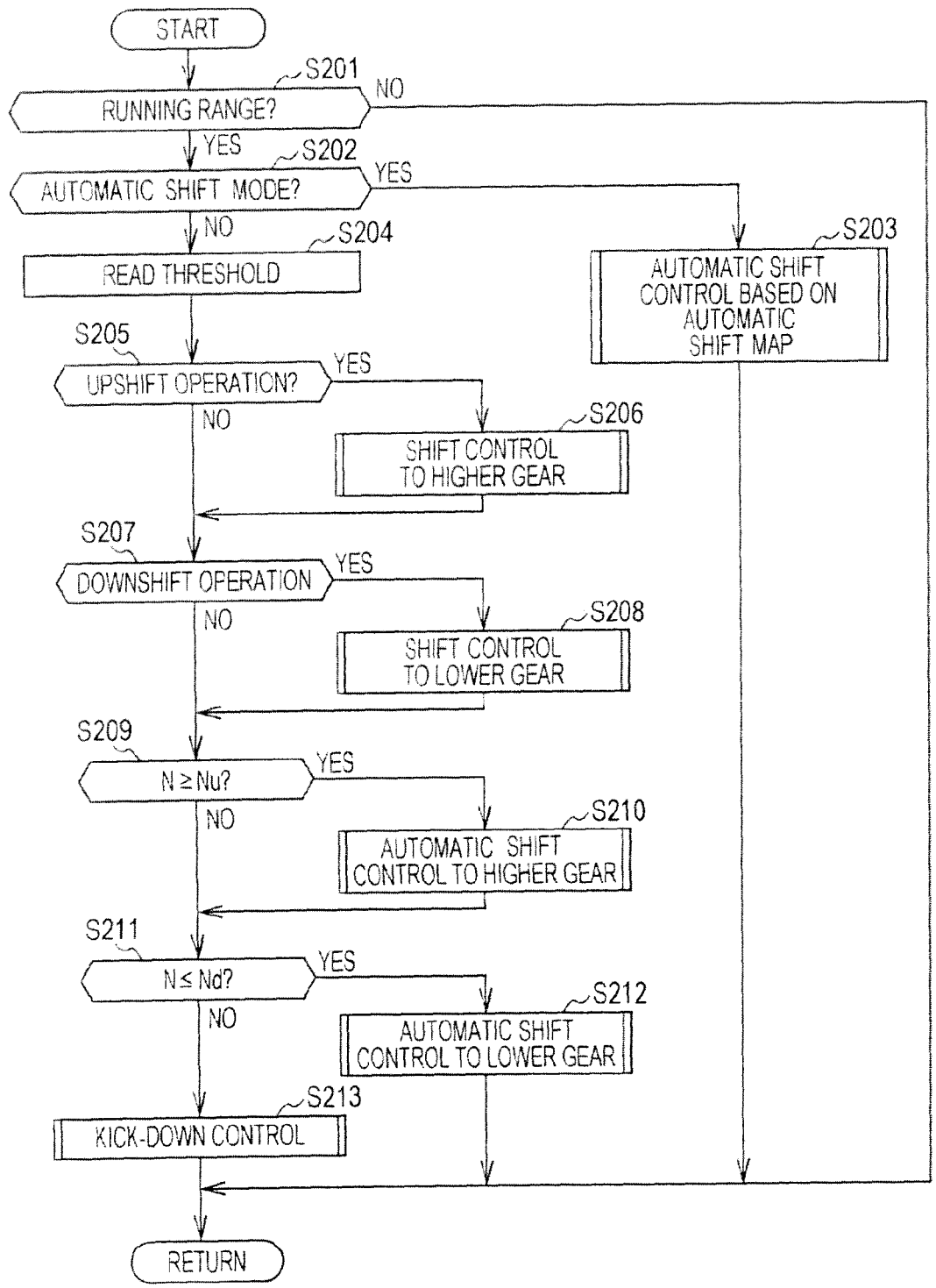
FIG. 6 is a flowchart showing a shift control routine of a continuously variable transmission.
Figure 7A:
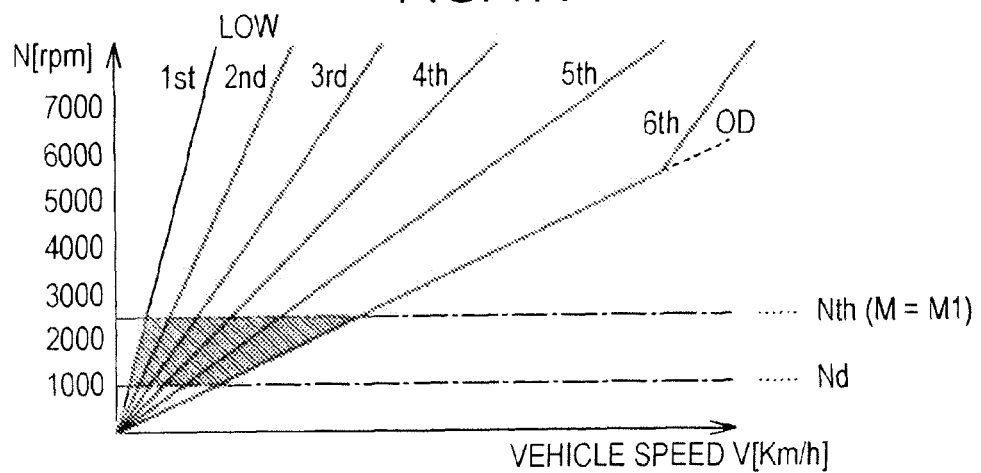
FIGS. 7A to 7C each illustrate a kick-down allowable speed in the normal mode, the save mode and the power mode having been respectively selected as a driving force characteristic mode.
Figure 7B:
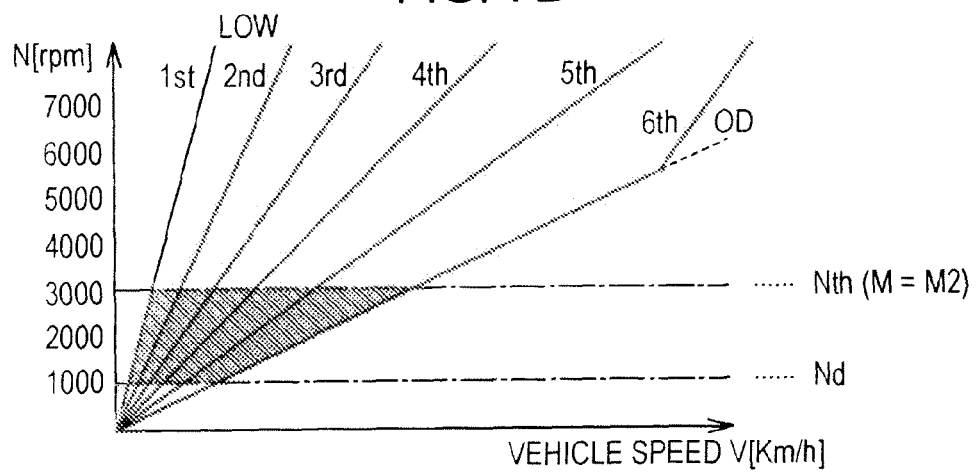
Figure 7C:
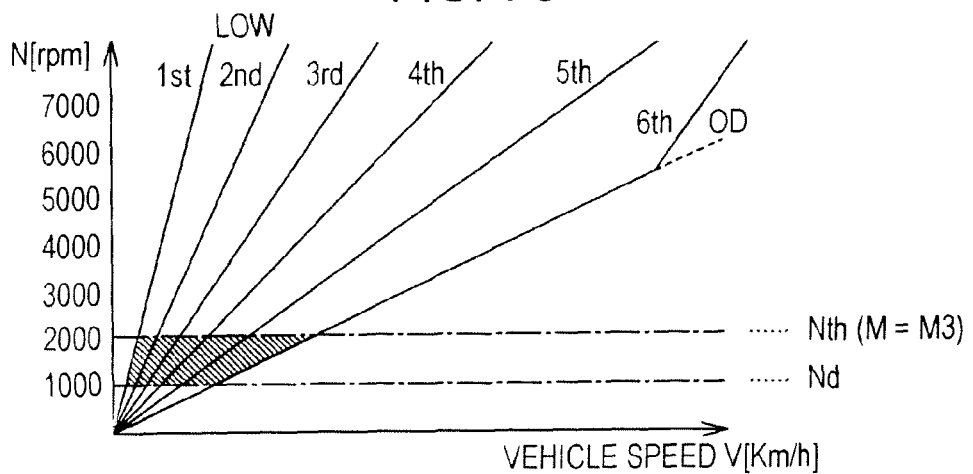
Figure 8:
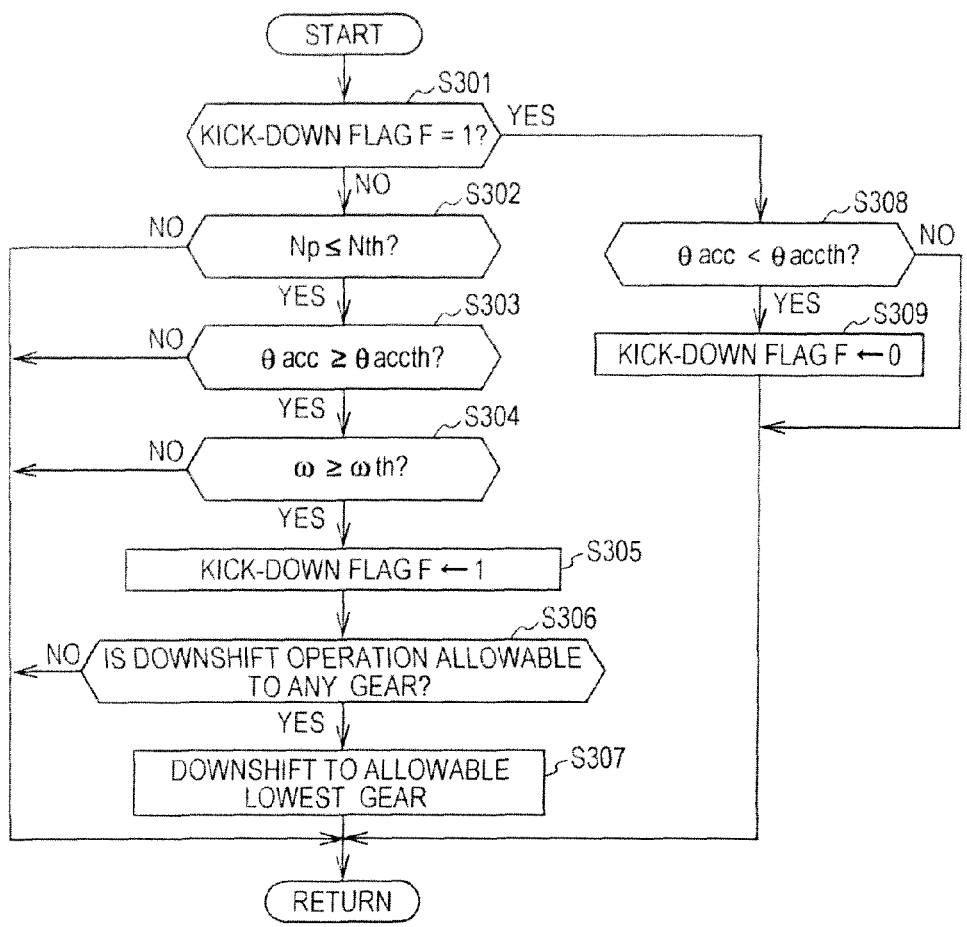
FIG. 8 is a flowchart showing a kick-down control subroutine.
Figure 9A:
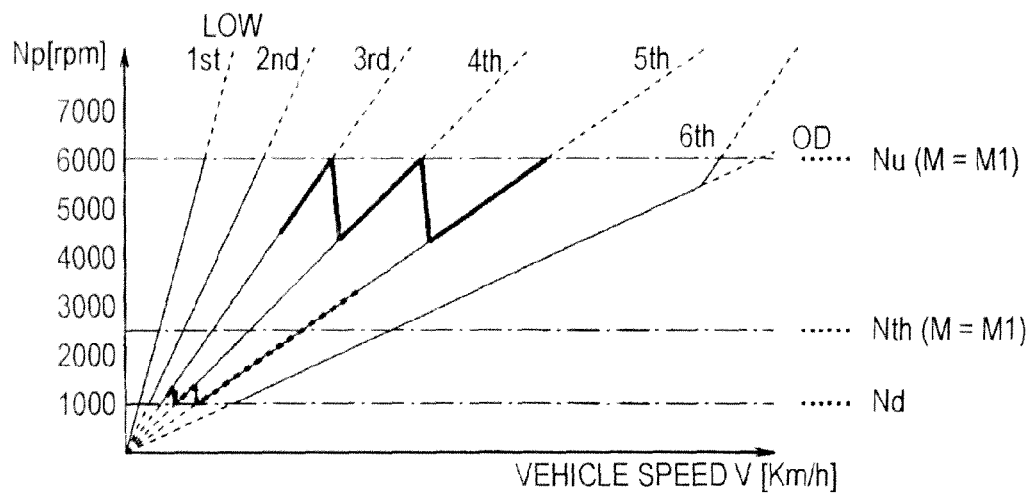
FIGS. 9A to 9C are explanatory diagram illustrating a transition of a gear ratio in the normal mode, the save mode and the power mode having been respectively selected as the driving force characteristic mode.
Figure 9B:
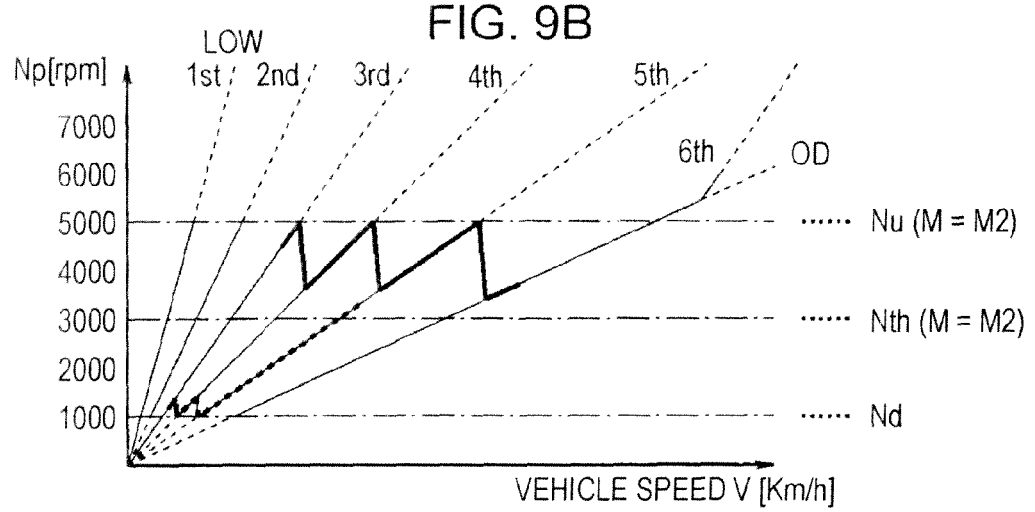
Figure 9C:
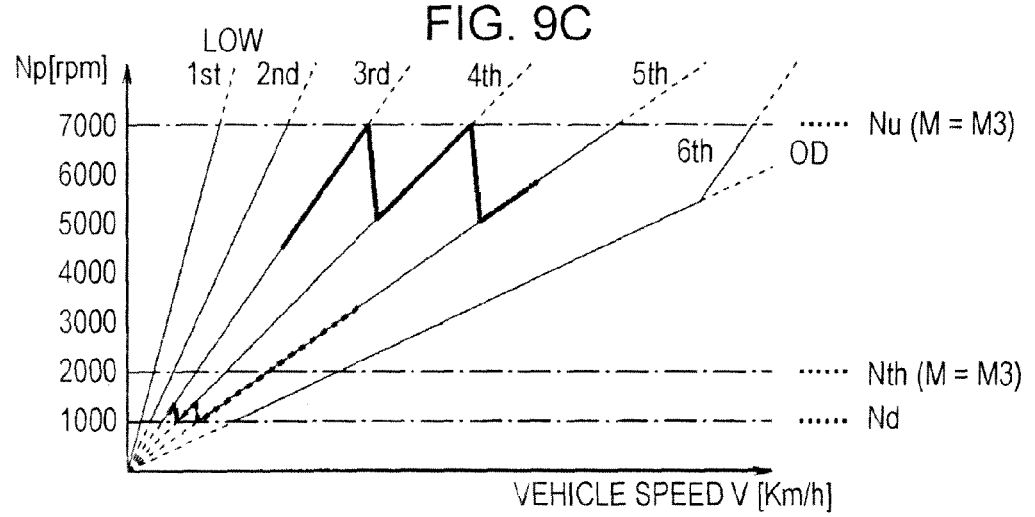
Figure 10A:
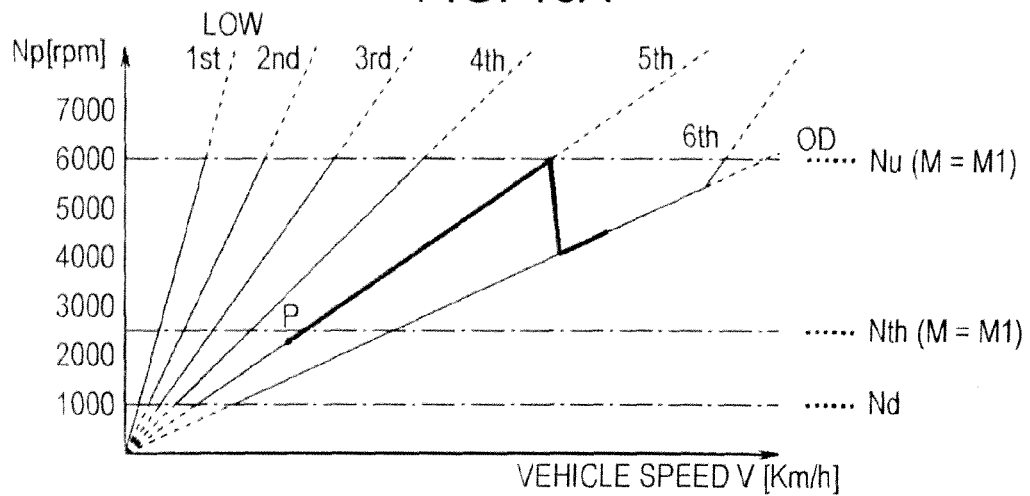
FIGS. 10A to 10C are explanatory diagram illustrating a transition of a gear ratio in the normal mode, the save mode and the power mode having been respectively selected as the driving force characteristic mode.
Figure 10B:
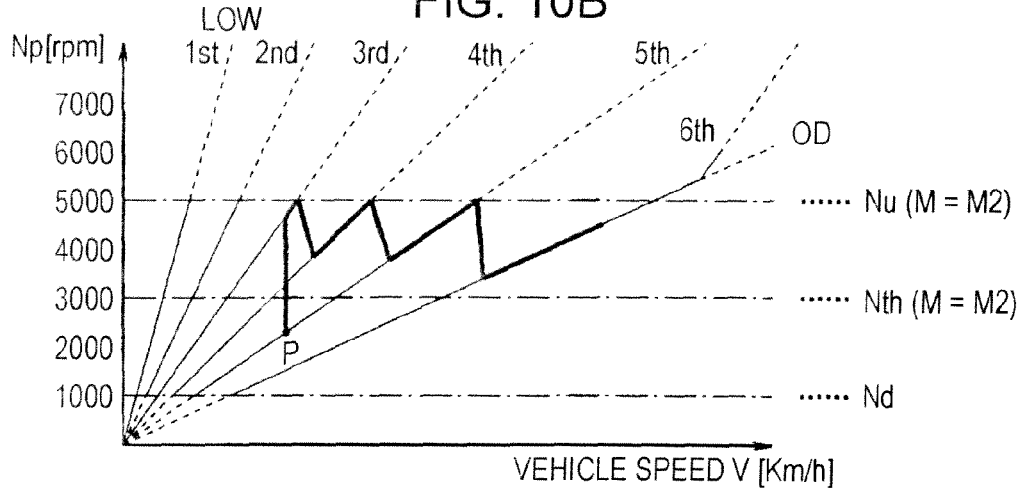
Figure 10C:
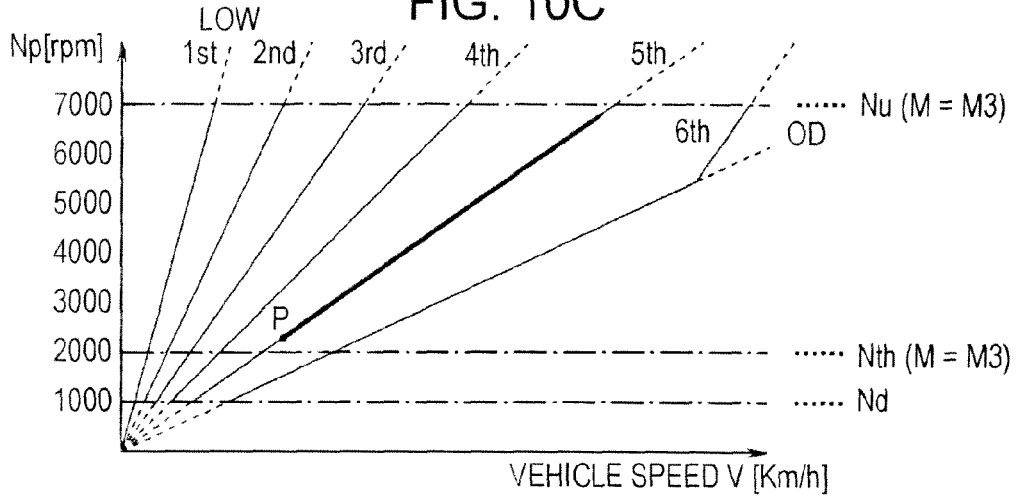
Figure 11A:
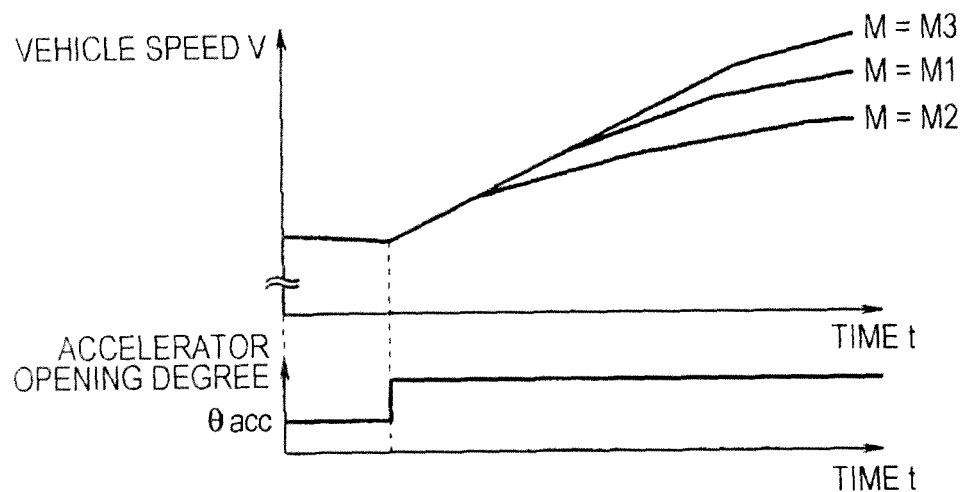
FIGS. 11A and 11B each exemplifies a vehicle speed transition with respect to an accelerator pedal depressing operation in each of the driving force characteristic modes having been selected in the manual shift mode.
Figure 11B:
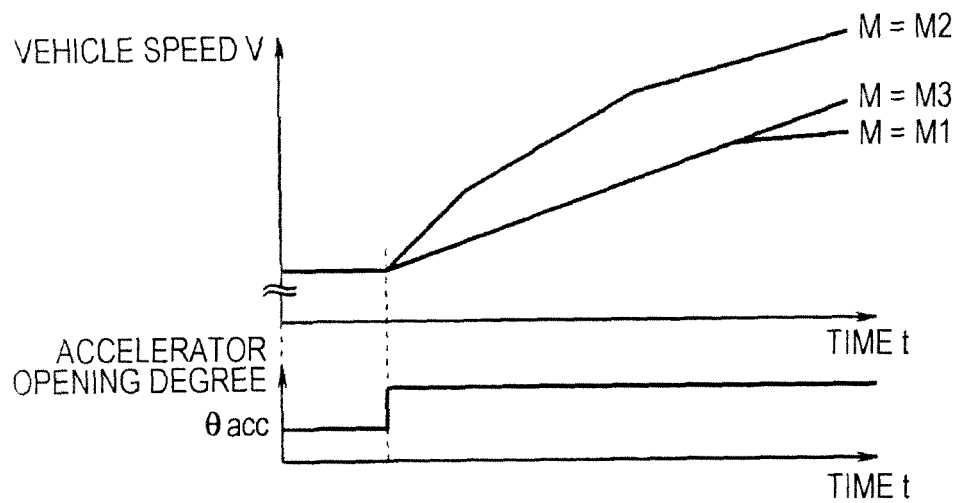
Figure 12A:
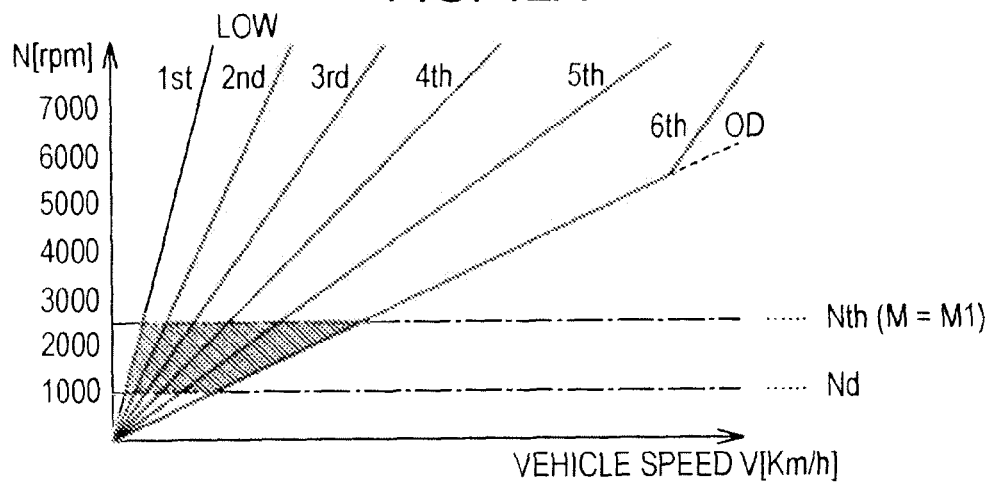
FIGS. 12A to 12C each exemplifies a modification of the kick-down allowable speed in the normal mode, the save mode and the power mode having been respectively selected as the driving force characteristic mode in the manual shift mode.
Figure 12B:
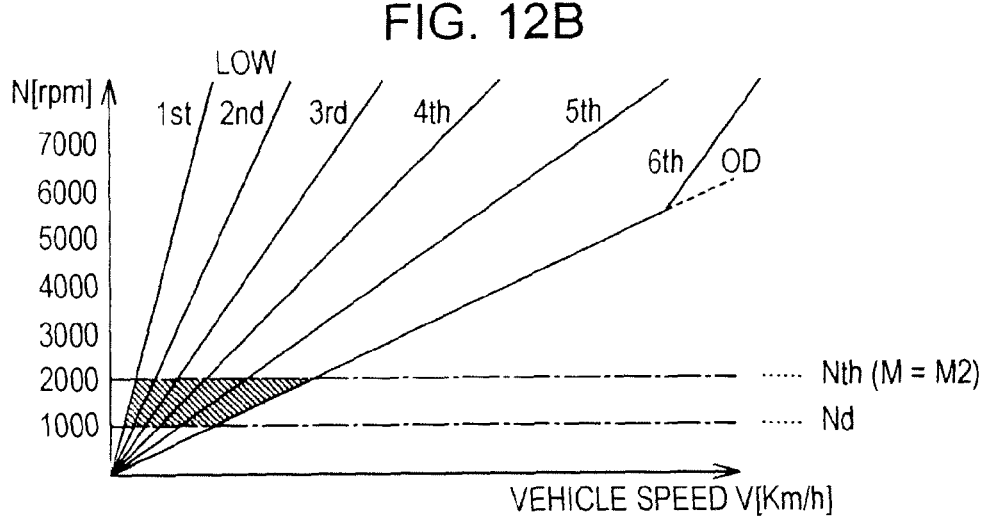
Figure 12C:
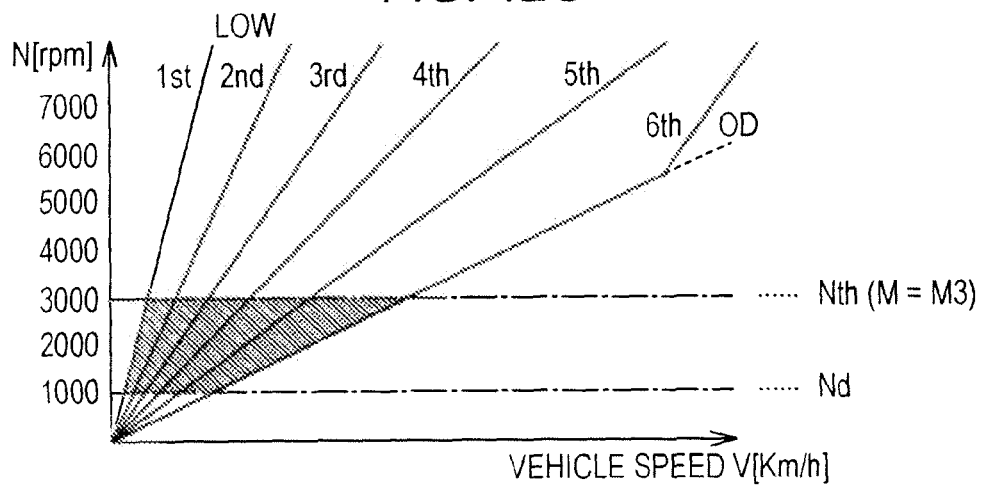

An embodiment of the present invention will be explained with reference to the drawings. The drawings relate to an embodiment of the present invention. FIG. 1 is a schematic block diagram of a power train mounted in. FIGS. 2A to 2C each conceptually show a normal mode map, a save mode map and a power mode map. FIG. 3 is a flowchart showing a throttle control routine of an engine. FIG. 4 is a conceptual diagram illustrating an automatic shift map. FIG. 5 is a conceptual diagram illustrating a manual shift map. FIG. 6 is a flowchart showing a shift control routine of a continuously variable transmission. FIGS. 7A to 7C each illustrate a kick-down allowable speed in the normal mode, the save mode and the power mode having been respectively selected as a driving force characteristic mode. FIG. 8 is a flowchart showing a kick-down control subroutine. FIGS. 9A to 9C are explanatory diagram illustrating a transition of a gear ratio in the normal mode, the save mode and the power mode having been respectively selected as the driving force characteristic mode. FIGS. 10A to 10C are explanatory diagram illustrating a transition of a gear ratio in the normal mode, the save mode and the power mode having been respectively selected as a driving force characteristic mode. FIGS. 11A and 11B each illustrate a vehicle speed transition with respect to an accelerator pedal depressing operation in each of the driving power characteristic modes having been selected in the manual shift mode. FIGS. 12A to 12C each illustrate a modification of the kick-down allowable speed in the normal mode, the save mode and the power mode having been respectively selected as the driving force characteristic mode in the manual shift mode.

In FIG. 1, a reference numeral 1 indicates an engine. The engine 1 forms main part of a power train 10 of a vehicle such as an automobile by being connected to a continuously variable transmission 3 via a starting clutch 2 such as an electromagnetic clutch or a torque converter.

The continuously variable transmission 3 includes a forward-reverse changeover device 4 connected to the starting clutch 2. A primary pulley 5a is pivotally supported by a pulley input shaft 5b extended from the forward-reverse changeover device 4. Further, a secondary pulley 5d is pivotally supported by a pulley output shaft 5c that is arranged in parallel to the pulley input shaft 5b. A driving belt 5e is mounted in such a manner to be wrapped around and the primary pulley 5a and the secondary pulley 5d. Still further, the pulley output shaft 5c is connected with a differential device 6b via a reduction gear group 6a of a final reduction gear 6. The differential device 6b is connected to a driving shaft 7 to which a front or rear driving shaft 7a is pivotally attached. In this embodiment, the gear ratio is set to "1" when the forward-reverse changeover device 4 is switched to a forward move. An engine speed Ne and a speed (primary speed Np) of the primary pulley 5a uniquely correspond to each other upon a forward move in which the starting clutch 2 is fastened.

A primary hydraulic pressure chamber 5f is provided adjacent to the primary pulley 5a. A groove width of the primary pulley 5a is adjusted by means of primary hydraulic pressure supplied to the primary hydraulic pressure chamber 5f by a hydraulic pressure control circuit 8. Meanwhile, a secondary hydraulic pressure chamber 5g is provided adjacent to the secondary pulley 5d. A tensile force required for torque transmission is provided to the driving belt 5e through a secondary hydraulic pressure supplied to the secondary hydraulic pressure chamber 5g by the hydraulic pressure control circuit 8. The hydraulic pressure control circuit 8 is controlled by a shift control device (T/M_ECU) 20 to be described later. The groove widths of both the pulleys 5a and 5d are controlled by means of the hydraulic pressure control so as to be inversely proportional to each other, thereby allowing the continuously variable transmission 3 to achieve an desired gear ratio.

The T/M_ECU 20 is connected to various control devices such as an engine control device (E/G_ECU) 21 and a integrated control device (integrated_ECU) 22 via an in-vehicle communication line 23 such as CAN (Controller Area Network) communication so as to allow communication therewith. Each of the ECUs 20 to 22 mainly includes a microcomputer that has a CPU, a ROM, a RAM, a non-volatile storage unit such as an EEPROM that are well-known.

To an input side of the T/M_ECU 20, connected are, for example, a primary speed sensor 38 for detecting primary speed Np of the primary pulley 5a, a secondary speed sensor 39 for detecting a speed (secondary speed Ns) of the secondary pulley 5d, an inhibitor switch 37 for detecting a range selected on a selector 36. Further, actuators such as the hydraulic pressure control circuit 8 are connected to an output side of the T/M_ECU 20.

The selector 36 of the present embodiment has, for example, a main gate 36a in which a parking (P) range, a reverse (R) range, a neutral (N) range and a drive (D) range are set, and a sub-gate 36b in which a manual (M) range is set. Each of the ranges on the respective gates 36a and 36b can be selected by way of a select lever 36c. The inhibitor switch 37 detects a selected range. In the sub-gate 36b, upshift (+) and downshift (−) positions are set with the manual range disposed therebetween. A manual switch 40 to be described later is disposed adjacent to the upshift and downshift positions. Then, when the select lever 36c is moved to the upshift or downshift position in the manual range having been selected, the manual switch 40 outputs an upshift signal or a downshift signal.

To an input side of the E/G_ECU 21, connected are, various sensors such as an engine speed sensor 30 for detecting an engine speed Ne based on rotations of a crankshaft, an intake air amount sensor 31 that is disposed, for example, immediately downstream of an air cleaner and detects an intake air amount Q, an accelerator opening degree sensor 32 for detecting an actual accelerator opening degree θacc based on the amount of the depression of an accelerator pedal, a throttle opening degree sensor 33 for detecting an opening degree θth of an electronically-controlled throttle valve 16 provided in a an intake air passage 15. To an output side of the E/G_ECU 21 connected are, for example, an injector 17 that injects a predetermined amount of fuel and an actuator that controls engine operation such as a throttle actuator 16a provided in the throttle valve 16.

To an output side of the integrated_ECU 22 connected are, for example, the above-described manual switch 40 described above, a mode selection switch 35 for selectively switching between control modes of the driving force characteristics generated by the power train 10 in response to an accelerator operation, and a temporary manual switch 42 disposed in a steering 41.

In the present embodiment, the driving force modes of the power train 10 include three kinds of mode M: a normal mode M1, a save mode M2 and a power mode M3. The integrated_ECU 22 outputs mode information selected by a driver via the mode selection switch 45 to the T/M_ECU 20 and the E/G ECU 21 via the in-vehicle communication line 23

Further, the temporary manual switch 42 includes a pair of operation units 42a and 42b. The temporary manual switch 42 outputs an upshift signal every time the operation unit 42a, which is disposed on a right side of the steering 41, is operated, and a downshift signal every time the operation unit 42b, which is disposed on a left side, is operated.

The E/G_ECU 21 has, for example, three mode maps Mpe1, Mpe2 and Mpe3 preset and stored in a memory thereof that represent engine output characteristics. As shown in FIGS. 2A to 2C, each of the mode maps includes a three-dimensional map in which lattice axes represent the accelerator opening degree θacc and the engine speed Ne, and each of lattice points stores an engine output instruction value (target torque).

The mode maps Mpe1, Mpe2 and Mpe3 are basically selected by the driver via the mode selection switch 35. That is, the E/G_ECU 21 selects the normal mode map Mpe1 when the normal mode M1 is selected via the mode selection switch 35, the save mode map Mpe2 when the save mode M2 is selected, the E/G_ECU 21 selects the save mode map Mpe2 and the power mode map Mpe3 when the power mode M3 is selected.

Based on the selected mode map Mpe and detection signals from various sensors, the E/G_ECU 21 sets a fuel injection timing and a fuel injection pulse width (pulse time) for the injector 17. Further, the E/G_ECU 21 outputs a throttle opening signal to the throttle actuator 16a, thereby controlling the opening degree of the throttle valve 16.

The normal mode map Mpe1 shown in FIG. 2A is configured to have target torque that linearly changes when the accelerator opening degree θacc is relatively small, and reaches its maximum when the throttle valve 16 is almost fully open.

In the save mode map Mpe2 shown in FIG. 2B, a rise in target torque is suppressed as compared to the normal mode map Mpe1, and the throttle valve 16 does not fully open even if the accelerator pedal is fully pressed. A change in the opening degree of the throttle valve 16 is relatively smaller than that in the normal mode when the accelerator pedal is depressed. Thus, even if the accelerator pedal is depressed by a same amount as in the normal mode, the throttle opening degree θe remains small, which suppresses a rise in output torque. As a result, accelerator operations such as fully depressing the accelerator pedal can be enjoyed by causing the vehicle to be driven with the output torque suppressed according to the save mode map Mpe2. In addition, since a rise in target torque is suppressed, a good balance can be achieved between ease of driving and better fuel economy. For example, even a vehicle equipped with a three-liter engine provides a smooth and mild output characteristics while producing a sufficient output comparable to a two-liter engine, in which the target torque is set in such a manner that h importance is placed on ease of handling in a practical operating range, particularly, during city driving.

Further, the power mode map Mpe3 shown in FIG. 2C is configured to provide a greater rate of in target torque in response to a change in the accelerator opening degree θacc over substantially the entire operating range. Thus, in the case of a vehicle equipped with a 3-liter engine, the target torque is set so as to allow the 3-liter engine to provide its maximum potential.

The T/M_ECU 20 has, for example, automatic shift maps Mpt1 to Mpt3 (see FIG. 4) for automatically controlling a gear ratio of the continuously variable transmission 3 according to the shift characteristics corresponding to the mode maps Mpe1 to Mpe3 described above and a manual shift map Mptm (see FIG. 5) for controlling the gear ratio of the continuously variable transmission 3 to fixed gear ratio of a preset gear stage (for example, first to sixth gear stages), preset and stored in a memory thereof. Based on the selected shift map Mpt and detection signals from various sensors, the T/M_ECU 20 controls the gear ratio of the continuously variable transmission 3 by controlling the hydraulic pressures to be supplied to the hydraulic pressure chamber 5f and the hydraulic pressure chamber 5g by the hydraulic pressure control circuit 8.

Basically the automatic shift maps Mpt1 to Mpt3 are selectively used depending on the mode M selected via the mode selection switch 35, when the drive range is selected on the selector 36, and the continuously variable transmission 3 is set to the automatic shift control mode. That is, the T/M_ECU 20 selects the automatic shift map Mpt1 when the normal mode M1 is selected through the mode selection switch 35, the automatic shift map, the automatic shift map Mpt2 when the save mode M2 is selected, and the automatic shift map Mpt3 when the power mode M3 is selected, so as to comply with the mode maps Mpe of the engine 1, respectively. Then, by referring to the thus selected automatic shift map Mpt, the T/M_ECU 20 sets a target primary speed Npt on the basis of the current vehicle speed V and the accelerator opening degree θacc, and thereby controls the gear ratio such that primary speed Np matches the primary speed Npt.

As shown in FIG. 4, for example, each of the automatic shift maps Mpt1 to Mpt3 includes a map in which a shift characteristic line indicating a relationship between the vehicle speed V and the target primary speed Npt is set for each value of the accelerator opening degree θacc between a gear ratio LOW and a minimum gear ratio overdrive (OD). In this case, in order to comply with the mode maps Mpe1 to Mpe3 for the engine output characteristics described above, the shift characteristic lines on the automatic shift maps Mpt1 to Mpt3 are basically set so as to calculate a of the target primary speed Npt at which the shift characteristic line for the mode M2 is relatively lower than the shift characteristic line for the mode M1, and a value of the target primary speed Npt at which the shift characteristic line for the mode M3 is relatively higher than the shift characteristic line for the mode M2.

With this setting, a proper shift control is performed based on the output characteristic of the engine 1 in the automatic shift mode where the drive range is selected on the selector 36, thereby allowing the power train 10 to produce a characteristic driving force for each of the modes selected by the mode selection switch 35.

Meanwhile, when the range of the selector 36 is changed from the drive range to the manual range so that the control mode of the continuously variable transmission 3 is changed from the automatic shift mode to the manual shift mode, the T/M_ECU 20 selects the manual shift map Mptm for shift control.

The T/M_ECU 20 basically shifts up the gear ratio of the continuously variable transmission 3 sequentially from the current gear ratio to a fixed gear ratio of a higher gear stage every time an upshift signal is output from the manual switch 40 or the temporary manual switch 42 via the integrated_ECU 22. Otherwise, the T/M_ECU 20 shifts down the gear ratio of the continuously variable transmission 3 sequentially from the current gear ratio to a fixed gear ratio of a lower gear stage every time a downshift signal is output from the manual switch 40 or the temporary manual switch 42 via the integrated_ECU 22.

Besides, if an upshift (or downshift) signal is output from the temporary manual switch 42 via the integrated_ECU 22, the T/M_ECU 20 temporarily shifts to and remains in the manual shift mode until preset specific return conditions are satisfied (that is, for example, until a preset period of time elapses), even if the drive range is selected on the selector 36. Then, the T/M_ECU 20 changes the gear ratio of the continuously variable transmission 3 to a fixed gear ratio of a gear stage selected by way of the temporary manual switch 42.

As described above, the T/M_ECU 20 of the embodiment is configured to have as the manual shift modes a steady manual shift mode that is maintained until the range of the selector 36 is changed back to the drive range after being changed to the manual range by the driver, and a temporary manual shift mode that the shift mode is switched over to through an operation of the temporary manual switch 42 while the selection on the selector 36 remains in the drive range and automatically returned to the automatic shift mode from when preset returning conditions are satisfied.

For some purposes such as preventing overspeed of the engine 1, the T/M_ECU 20 performs a forced automatic change of the gear ratio to a fixed gear ratio of a higher gear stage if an input speed to the continuously variable transmission 3 (that is, the primary speed Np) exceeds a preset automatic upshift speed Nu. Further, for some purposes such as securing required acceleration performance and thereby enhancing drivability, the T/M_ECU 20 performs a forced automatic change of the gear ratio to a fixed gear ratio of a lower gear stage if the primary speed Np falls below a preset automatic downshift speed Nd.

The automatic upshift speed Nu is set to a different value for each of the driving force characteristic modes M. Specifically, the automatic upshift speed Nu is, for example, set higher as responsiveness to an accelerator operation in the driving force characteristic mode is higher. Thus, the automatic upshift speed Nu is set highest in the power mode M3, lower in the normal mode M1 and further lower in the save mode M2. Assuming that, for example, that the maximum speed of the engine 1 is set to 7000 [rpm] for preventing excessive rotation thereof, and that the engine speed Ne upon a forward move in which the starting clutch 2 is fastened and the primary speed Np uniquely correspond to each other, the automatic upshift speed Nu is set to 7000 [rpm] for the power mode M3 (M=M3), 6000 [rpm] for the normal mode M1 (M=M1) and 5000 [rpm] for the save mode M2 (M=M2). On the other hand, the automatic downshift speed Nd of the present embodiment is set to one and the same value (for example, 1000 [rpm]) for all the modes M1 to M3.

Further, in the manual shift mode having been selected, the T/M_ECU 20 performs automatic downshift control (so-called kick-down control) in which the gear stage is automatically changed to a gear stage that is lower than the current gear stage if the primary speed Np is lower than or equal to a preset kick-down allowable speed Nth and if an accelerator pedal depression amount θacc reached by the driver is larger than or equal to a preset kick-down allowable depression amount θaccth.

The T/M_ECU 20 has a different value of the kick-down allowable speed Nth for each of the driving force characteristic modes M. Specifically, the kick-down allowable speed Nth of the present embodiment is set lower as responsiveness to an accelerator operation in the driving force characteristic mode is higher. Thus, the kick-down allowable speed Nth Nth is lowest in the power mode M3, higher in the normal mode M1 and further higher in the save mode M2. More specifically, as exemplified in FIG. 7, the kick-down allowable speed Nth corresponding to each of the modes M is set to 2000 [rpm] for the power mode M3 (M=M3), 2500 [rpm] for the normal mode M1 (M=M1) and 3000 [rpm] for the save mode M2 (M=M2).

Further, it is preferable that the kick-down allowable depression amount θaccth should be set to a different value for each of the modes M. For example, the T/M_ECU 20 has a larger value of the kick-down allowable depression amount θaccth for a driving force characteristic mode having higher responsiveness to an accelerator operation. Specifically, for example, the kick-down allowable depression amount θaccth is set to 80 [percent] for the power mode M3 (M=M3), 70 [percent] for the normal mode M1 (M=M1) and 60 [percent] for the save mode M2 (M=M2).

In order to properly prevent unnecessary kick-down control from being performed, it is preferable that the kick-down control should be prohibited in the case where an accelerator pedal depression speed ω is lower than or equal to a preset kick-down allowable depression speed ωth before the accelerator pedal depression amount θacc becomes equal to or higher than the kick-down allowable depression amount depth θaccth, even if the primary speed Np and the accelerator pedal depression amount θacc satisfy the requirements described above. It is preferable that the kick-down allowable depression speed ωth should also be set to a different value for each of the modes M. The T/M_ECU 20 of the embodiment has a larger value of the kick-down allowable depression speed ωth for a driving force characteristic mode having higher responsiveness to an accelerator operation. Specifically, for example, the kick-down allowable depression speed ωth is set to 200 [percent/sec] for the power mode M3 (M=M3), 150 [percent/sec] for the normal mode M1 (M=M1) and 100 [percent/sec] for the save mode M2 (M=M2).

By setting a different automatic downshift control (kick-down control) condition for each of the modes M as described above, for example, a kick-down operation is left to the driver's active operational input to a greater extent as the manual shift mode having been selected has higher responsiveness to an accelerator operation in the driving force characteristic mode (that is, as the mode is sportier). The kick-down allowable speed Nth can be set to 0 [rpm] in the sportiest driving force characteristic mode (that is, the power mode M3 in the present embodiment) so that the kick-down operation is entirely left to the driver's gear shifting operation.

As described above, in this embodiment, the T/M_ECU 20 has a function as an automatic downshift control unit.

Next, engine throttle control performed by the E/G_ECU 21 will be explained based on a flowchart of a throttle control routine shown in FIG. 3. The routine is executed at every preset time interval. When the routine starts, the E/G_ECU 21 firstly reads a currently set mode M in step 101, and then, proceeds to step S102.

When the E/G_ECU 21 proceeds to step S102 from step S101, the E/G_ECU 21 examines whether or not the mode selection switch 35 is turned on. When it is determined that the mode selection switch 35 is not turned on, the E/G_ECU 21 proceeds to step S107.

When it is determined in step S102 that the mode selection switch 35 is turned on, the E/G_ECU 21 proceeds to step S103 where it makes a determination as to which mode is selected by the driver.

When it is determined in step S103 that the normal mode M1 is selected by the driver, the E/G_ECU 21 proceeds to S104 where it sets the mode M to the normal mode M1 (M←M1), and then proceeds to step S107.

When it is determined in step S103 that the save mode M2 is selected by the driver, the E/G_ECU 21 proceeds to step S105 where it sets the mode M to the save mode M2 (M←M2), and then proceeds to step S107.

When it is determined in step S103 that the power mode M3 is selected by the driver, the E/G_ECU 21 proceeds to a step S106 where it sets the mode M to the power mode M3 (M←M3), and then proceeds to step S107.

When the E/G_ECU 21 proceeds to step 5107 from step S102, S104, S105 or S106, the E/G_ECU 21 reads a mode map Mpe corresponding to the currently selected mode M currently and determines a target torque τe by referring to the mode map Mpe with interpolation calculation on the basis of the current engine speed Ne and opening degree θacc.

Then, when the E/G_ECU 21 proceeds to step S108 from step S107, the E/G_ECU 21 determines a target throttle opening degree θe corresponding to the target torque τe. In subsequent step S109, the E/G_ECU 21 performs feedback control for the throttle actuator 16a in such a manner that the throttle opening degree θth matches the target throttle opening degree θe, and then exits the routine.

As a result, when the driver depresses the accelerator pedal, the throttle valve 16 is opened or closed based on the parameters including the accelerator opening degree θacc and the engine speed Ne according to the mode M selected by the driver, thereby allowing The engine 1 to be operated so as to provide an output characteristic that varies according to the modes M.

Next, shift control of the continuously variable transmission 3 that is executed by the T/M_ECU 20 will be explained according to a flowchart of a shift control routine shown in FIG. 6. The routine is executed at every preset time interval. When the routine starts, the T/M_ECU 20 examines firstly examines in step S201 whether or not the currently selected range on the selector 36 is a running range (that is, the drive range or the manual range).

When it is determined in step S201 that the current range is other than the running range, the T/M_ECU 20 exits the routine without any change.

When it is determined in step S201 that the current range is the running range, the T/M_ECU 20 proceeds to step S202 where a determination is made as to whether or not the automatic shift mode is selected as the control mode of the continuously variable transmission 3.

When it is determined in step S202 that the current range is the drive range, the T/M_ECU 20 proceeds to step S203 where automatic shift control is performed on the basis of an automatic shift map. Then the T/M_ECU 20 exits the routine. That is, the T/M_ECU 20 selects the automatic shift map Mpt corresponding to the mode M currently selected by the mode selection switch 35 from the automatic shift maps Mpt1 to Mpt3 at the step S203. Then, by referring to the selected automatic shift map Mpt, the T/M_ECU 20 sets the target primary speed Npt based on the vehicle speed V and the accelerator opening degree θacc in order to perform automatic shift control through the control of the hydraulic pressures supplied to the hydraulic pressure chambers 5f and 5g by the hydraulic pressure control circuit 8 such that the primary speed Np matches the target primary speed Npt.

Meanwhile, when it is determined in step S202 that the manual shift mode is selected as the current control mode, the T/M_ECU 20 proceeds to step S204 where the T/M_ECU 20 reads the manual shift map Mptm as well as thresholds corresponding to the currently selected mode M. That is, in step S204 the T/M_ECU 20 reads thresholds of, for example, the automatic upshift speed Nu, the automatic downshift speed Nd, the kick-down allowable speed Nth, the kick-down allowable depression amount θaccth, and the kick-down allowable depression speed ωth that correspond to the current mode M.

When T/M_ECU 20 proceeds to step S205 from step S204, the T/M_ECU 20 examines whether or not an upshift operation is performed by the driver on the basis of a signal from the manual switch 40 or the temporary manual switch 42. When it is determined that an upshift operation is performed, the T/M_ECU 20 proceeds to step S206. When it is determined that no upshift operation is performed, the T/M_ECU 20 proceeds to step S207.

When the T/M_ECU proceeds to step S206 from step S205, the T/M_ECU 20 examines whether or not the manual shift map Mptm includes a gear stage that is higher than the current gear stage. If a higher gear stage is included, the T/M_ECU 20 controls the hydraulic pressures supplied to the hydraulic pressure chambers 5f and 5g by the hydraulic pressure control circuit 8 so as to shift up the gear ratio of the continuously variable transmission 3 to a fixed gear ratio of a gear stage that is higher by one stage than the current gear stage. Then, the T/M_ECU 20 proceeds to step S207.

When T/M_ECU 20 proceeds to step S207 from step S205 or S206, the T/M_ECU 20 examines whether or not a downshift operation is performed by the driver on the basis of a signal from the manual switch 40 or the temporary manual switch 42.

When it is determined in step S207 that a downshift operation is performed, the T/M_ECU 20 proceeds to step S208. When it is determined that no downshift operation is performed, the T/M_ECU 20 proceeds to step S209.

When the T/M_ECU 20 proceeds to step S208 from step S207, the T/M_ECU 20 examines whether or not the manual shift map Mptm includes a gear stage that is lower than the current gear stage. If a lower gear stage is included, the T/M_ECU 20 controls the hydraulic pressures supplied to the hydraulic pressure chambers 5f and 5g by the hydraulic pressure control circuit 8 so as to shift down the gear ratio of the continuously variable transmission 3 to a fixed gear ratio of a gear stage that is lower by one stage lower than the current gear stage. Then, the T/M_ECU 20 proceeds to step S209.

When the T/M_ECU 20 proceeds to step S209 from step S207 or S208, the T/M_ECU 20 examines whether or not the primary speed Np is higher than or equal to the currently selected automatic upshift speed Nu. When it is determined that the primary speed Np is higher than or equal to the automatic upshift speed Nu, the T/M_ECU 20 proceeds to step S210. When it is determined that the primary speed Np is lower than the automatic upshift speed, the T/M_ECU 20 proceeds to step S211.

When the T/M_ECU 20 proceeds to step S210 from step S209, the T/M_ECU 20 examines whether or not the manual shift map Mptm includes a gear stage that is higher than the current gear stage. If a higher gear stage is included, the T/M_ECU 20 controls the hydraulic pressures supplied to the hydraulic pressure chambers 5f and 5g by the hydraulic pressure control circuit 8 so as to shift up the gear ratio of the continuously variable transmission 3 a fixed gear ratio of a gear stage that is higher by one stage than the current gear stage. Then, the T/M_ECU 20 proceeds to step S211.

When the T/M_ECU 20 proceeds to step S211 from step S209 or S210, the T/M_ECU 20 examines whether or not the primary speed Np is lower than or equal to the currently selected automatic downshift speed Nd. When it is determined that the primary speed Np is lower than or equal the automatic downshift speed Nd, the T/M_ECU 20 proceeds to step S212. When it is determined that the primary speed Np is higher than the automatic downshift speed Nd, the T/M_ECU 20 proceeds to step S213.

When the T/M_ECU 20 proceeds to step S212 from step S211 to, the T/M_ECU 20 examines whether or not the manual shift map for Mptm includes a gear stage that is lower than the current gear stage. If a lower gear stage is included, the T/M_ECU 20 controls the hydraulic pressure supplied to the hydraulic pressure chambers 5f and 5g by the hydraulic pressure control circuit 8 so as to shift down the gear ratio of the continuously variable transmission 3 to a fixed gear ratio of a gear stage that is lower by one stage than the current gear stage. Then, the T/M_ECU 20 exits the routine.

Meanwhile, when the T/M_ECU 20 proceeds to step 213 from step S211, the T/M_ECU 20 performs kick-down control (automatic shift control for shifting to a lower gear stage in response to the driver's accelerator operation), and then exits the routine.

The kick-down control is performed in step S213 according to, for example, a flowchart of a kick-down control subroutine shown in FIG. 8. When the subroutine starts, the T/M_ECU 20 examines whether or not a kick-down flag F is set to "1" that indicates that that a condition for performing the kick-down is already satisfied.

When it is determined in step S301 that the kick-down flag F is set to "1", the T/M_ECU 20 proceeds to step S308. When it is determined that the kick-down flag F is reset to "0", the T/M_ECU 20 proceeds to step S302.

When T/M_ECU 20 proceeds to step S302 from step S301, the T/M_ECU 20 examines whether or not the primary speed Np is lower than or equal to the kick-down allowable speed Nth.

When it is determined in step S302 that the primary speed Np is lower than or equal to the kick-down allowable speed Nth, the T/M_ECU 20 proceeds to step S303. When it is determined that the primary speed Np is higher than the kick-down allowable speed Nth, the T/M_ECU 20 exits the subroutine without any change.

When T/M_ECU 20 proceeds to step S303 from step S302, the T/M_ECU 20 examines whether or not the accelerator pedal depression amount θacc reached by the driver is higher than or equal to the kick-down allowable depression amount θaccth.

When it is determined in step S303 that the accelerator pedal depression amount θacc is higher than or equal to the kick-down allowable depression amount θaccth, the T/M_ECU 20 proceeds to step S304. When it is determined that the accelerator pedal depression amount θacc is smaller than the kick-down allowable depression amount θaccth, the T/M_ECU 20 exits the subroutine without any change.

When T/M_ECU 20 proceeds to step S304 from step S303, the T/M_ECU 20 examines whether or not the accelerator pedal depression speed ω reached by the driver is higher than or equal to the kick-down allowable depression speed ωth, on the basis of, for example, an amount of change in the accelerator pedal depression amount θacc in a setting cycle before it reaches the kick-down allowable depression amount θaccth.

When it is determined in step S304 that the accelerator pedal depression speed ω is higher than or equal to the kick-down allowable depression speed ωth, the T/M_ECU 20 proceeds to a step S305. When it is determined that the accelerator pedal depression speed ω is lower than the kick-down allowable depression speed ωth, the T/M_ECU 20 exits the subroutine without any change.

When T/M_ECU 20 proceeds to step S305 from step S304, the T/M_ECU 20 sets the kick-down flag F to "1", and examines in subsequent step S306 whether or not there is a gear stage to which a downshift operation can be performed within an allowable speed (the primary rotations Np) of the engine 1.

When it is determined in step S306 that there is no gear stage to which a downshift operation can be performed, the T/M_ECU 20 exits the subroutine without any change.

When it is determined in step S306 that there is a gear stage to which a downshift operation can be performed to, the T/M_ECU 20 proceeds to step S307 where the T/M_ECU 20 shifts down (kicks down) the gear ratio of the continuously variable transmission 3 to a currently allowed lowest gear stage, and then exits the subroutine.

When the T/M_ECU 20 proceeds to step S308 from step S301, the T/M_ECU 20 examines whether or not the accelerator pedal depression amount θacc is smaller than the kick-down allowable depression amount θaccth. When it is determined that the accelerator pedal depression amount θacc is larger than or equal to the kick-down allowable depression amount θaccth, the T/M_ECU 20 exits the subroutine without any change.

When it is determined in step S308 that the accelerator depression amount θacc is smaller than the kick-down allowable depression amount θaccth, the T/M_ECU 20 proceeds to step S309. In step S309 the T/M_ECU 20 resets the downshift flag F to "0", and then exits the subroutine.

In the power train 10 of the embodiment described above having a plurality of driving force characteristic modes M, the automatic upshift speed Nu can be set to a different value for each of the modes M generated by the power train 10 in the manual shift mode having been selected as the control mode of the continuously variable transmission 3 of the power train 10, whereby the driving force characteristic (in the present embodiment, driving force characteristic based on a difference in the output power characteristic of the engine 1) in each of the modes M can be made clear and distinctive even in the manual shift mode in which the driver's intention of shifting is given priority.

Specifically, for example, in a range lower than or equal to a primary speed Npmax corresponding to a maximum speed Nemax of the engine 1 that allowed for preventing excessive rotation thereof, the automatic upshift speed Nu is set higher for the driving force characteristic mode M having higher responsiveness to an accelerator operation, whereby the features of the driving force characteristic modes M can be made clear and distinctive in the manual shift mode being selected while agreeing with the driver's feeling and the like. For example, in the case in which three types of the mode M (the normal mode M1, the save mode M2 and the power mode M3) are provided as the driving force characteristic mode M, the automatic upshift speed Nu is set such that it is highest for the power mode M3, lower for the normal mode M1 and further lower the save mode M2, thereby, together with different output power characteristics of the engine 1 for each of the modes M, achieving driving having the driving force characteristic that agrees with the driver's feeling is achieved, even in the manual shift mode having been selected. Even in the case in which, for example, the driver depresses the accelerator pedal in the manual shift mode having been selected under a same traveling state, as shown by bold solid lines in FIGS. 9A to 9C, automatic upshift operations are successively performed on earlier timing in the save mode M2 having been selected (refer to FIG. 9B) than in the normal mode M1 having been selected (refer to FIG. 9A), awhile they are successively performed on later timing in the power mode M3 having been selected (refer to FIG. 9C) than in the normal mode M1 having been selected. Thus, even in the manual shift mode M1 having been selected, acceleration performance can be clear and distinctive for each of the modes M, as exemplified in FIG. 11A. Note that bold dashed lines in FIGS. 9A to 9C show, for example, automatic downshift in coast cruising in the manual shift mode.

Further, in the case in which the primary speed Np is lower than or equal to the kick-down allowable speed Nth and the accelerator pedal depression amount θacc is larger than or equal to the kick-down allowable depression amount θaccth, the driver's intention of acceleration is identified from the driver's accelerator operation to kick down the gear stage to the lower gear stage in the manual shift mode having been selected, thereby achieving automatic shifting that agrees with the driver's intention while respecting the gear stage selected by the driver. At that time, the kick-down allowable speed Nth is set to a different value for each of the driving force characteristic modes M and, a range of the speed in which a kick-down operation is allowed to be automatically performed on the basis of the primary speed Np is set narrower for a mode M having higher responsiveness to an accelerator operation, thereby achieving kick-down control which agrees with the driver's feeling. That is, for example, a driver of a sports-oriented vehicle may feels an automatic kick-down operation more unnecessary in the manual shift mode as the mode M selected by the driver is sportier. Thus, the kick-down allowable speed Nth is set lower for a mode M having higher responsiveness to an accelerator operation, thereby achieving intervention in shifting that agrees with the driver's intention without causing a sense of discomfort.

Further, the kick-down allowable depression amount θaccth is set to a different value for each of the driving force characteristic modes M, and a threshold of the accelerator pedal depression amount θacc for determining whether or not the automatic kick-down operation is performed is set larger for a mode M having higher responsiveness to an accelerator operation, thereby achieving kick-down control that agrees more closely with the driver's feeling.

In addition, even if the primary speed Np and the accelerator pedal depression amount θacc satisfy the above requirements, the kick-down control is prohibited if the accelerator pedal depression speed ω is lower than or equal to the preset kick-down allowable depression speed ωth before the accelerator pedal depression amount θacc becomes equal to or higher than the kick-down allowable depression amount θaccth. As a result, unnecessary kick-down can be properly prevented from being performed against the driver's intention. Kick-down control that agrees with the driver's feeling can also be achieved in this case by setting a the kick-down allowable depression speed ωth to a different value for each of the modes M and setting the kick-down allowable depression speed ωth greater for a mode M having higher responsiveness to an accelerator operation.

Next, an example of the kick-down control will be explained with reference to FIGS. 10A to 10C for a case in which the driver is driving the vehicle in each of the modes M in similar conditions (as to the primary speed Np and the vehicle speed V) and that the driver depresses the accelerator pedal in a similar manner.

FIG. 10B shows an example in the save mode M2 having been selected. Driving conditions on a point P belong to a range where the primary speed Np is lower than or equal to the kick-down allowable speed Nth. The kick-down allowable depression amount θaccth and the kick-down allowable depression speed ωth are set lowest in the save mode M2 among all the three modes M. Accordingly, a kick-down operation can be easily identified even if the driver's depresses the accelerator pedal lightly. Thus, in FIG. 10B, the driver's operation to depress the accelerator pedal in the driving conditions on the point P causes the gear stage to be kicked down from the fifth gear to the third gear.

FIG. 10A shows an example in the normal mode M1 having been selected. Driving conditions on the point P belong to a range where the primary speed Np is lower than or equal to the kick-down speed Nth. In the normal mode M1, the kick-down depression amount θaccth and the kick-down allowable depression speed ωth are set higher than in the save mode M2. Thus, in FIG. 10A, the driver's operation to depress the accelerator pedal in the driving conditions on the point P causes no kick-down operation to performed, and the fifth gear selected by the driver is maintained.

FIG. 10C shows an example in the power mode M3 having been selected. Driving conditions on the point P belong to a range where the primary speed Np is higher than the kick-down allowable speed Nth. Thus, in FIG. 10C, the driver's operation to depress the accelerator pedal in the driving conditions on the point P causes no kick-down operation to be performed, and the fifth gear selected by the driver is maintained. Further, even if the driving conditions on the point P belong to a range where the primary speed Np is lower than or equal to the kick-down allowable speed Nth, the kick-down allowable pedal depression amount θaccth and the kick-down allowable depression speed ωth are set highest in the power mode M3 among all the three modes M. Thus, a kick-down operation due to the driver's operation to depress the accelerator pedal is not easily performed, and the gear stage selected by the driver is given highest priority.

Thus, as shown in FIG. 11B, for example, if the accelerator pedal is depressed in the manual shift mode having been selected, the kick-down operation is performed in a different manner in each of the modes M, and different acceleration performance is achieved in each of the modes M depending upon the manner in which the kick-down operation is performed.

While driving a vehicle that places a particular emphasis on ease of driving or comfort rather than sporty driving in the shift transmission mode, the driver is unlikely to manually shift gears frequently even in the power mode M3 having been selected. Thus, such a vehicle should preferably be controlled such that a kick-down operation is performed more easily in a mode having higher responsiveness to an accelerator operation, in contrast to the kick-down control incorporating the driver's shifting operation described above.

Specifically, the kick-down allowable speed Nth for such a vehicle is set higher, for example, for a driving force characteristic mode having higher responsiveness to an accelerator operation. More specifically, the kick-down allowable speed Nth is set highest for the power mode M3, lower for the normal mode M1 and further lower for the save mode M2. In FIG. 12, for example, the kick-down allowable speed Nth is set to 3000 [rpm] for the power mode M3 (M=M3), 2500 [rpm] for the normal mode M1 (M=M1) and 2000 [rpm] for the save mode M2 (M=M2).

Further, the kick-down allowable depression amount θaccth should preferably be set to a different value for each of the modes M. For example, T/M_ECU 20 has a smaller value of the kick-down allowable depression amount θaccth for a driving force characteristic mode having higher responsiveness to an accelerator operation. Specifically, the kick-down allowable depression amount θaccth is set to 60 [percent] for the power mode M3 (M=M3), 70 [percent] for the normal mode M1 and 80 [percent] for the save mode M2.

Further, In order to properly prevent unnecessary kick-down control from being performed, the kick-down control should preferably be prohibited in the case where an accelerator pedal depression speed ω is lower than or equal to the preset kick-down allowable pedal depression speed ωth before the accelerator pedal depression amount θacc becomes equal to or higher than the kick-down allowable pedal depression amount θaccth, even if the primary speed Np and the accelerator pedal depression amount θacc satisfy the requirements described above. In this case, it is also preferable that the kick-down allowable depression speed θth should be set to a different value for each of the modes M. For example, the kick-down allowable depression speed θth of the T/M_ECU 20 is set smaller for the driving force characteristic mode having higher responsiveness to an accelerator operation. Specifically, for example, the kick-down allowable depression speed ωth is set to 100 [percent/sec] for the power mode M3 (M=M3), 150 [percent/sec] for the normal mode M1 (M=M1) and 150 [percent/sec] for the save mode M2 (M=M2).

By making the conditions for the automatic downshift control (kick-down control) different for each of the modes M as described above, a kick-down operation upon the manual shift mode having been selected is automatically performed more actively for a driving force characteristic mode having higher responsiveness to an accelerator operation (that is, for a sportier mode). Note that the kick-down allowable speed Nth can be set to 0 [rpm] in the driving force characteristic mode that has the lowest responsiveness to an accelerator operation (that is, the save mode M2 in the present embodiment).

According to such settings, depending upon a character of the vehicle, an automatic shift operation which agrees with the driver's intention can be achieved without a sense of discomfort as necessary while the gear stage selected by the driver is maintained.

The present invention is not limited to the embodiment described above, and can be variously modified or changed, which would also fall within the scope of the present invention.

For example, the embodiment of the present invention has been explained for the power train 10 that has three types of driving characteristic modes, the present invention can be applied to a power train that has two types of driving characteristic modes or four or more types of driving characteristic modes. In these cases, two or four or more types of the kick-down allowable speed and the like can be set.

Further, while the embodiment of the present invention has been explained for the case where a continuously variable transmission is applied to the automatic transmission, so can be a multistage transmission. In such a case, the embodiment can be applied by replacing the term "gear ratio" with the term "gear stage".

What is claimed is:

1. A vehicle driving-force control device having an automatic shift mode in which a gear ratio or a gear stage is automatically controlled according to a preset shift characteristic and a manual shift mode in which one of a plurality of gear stages can be manually selected for controlling an automatic transmission constituting a power train, the driving-force control device having a plurality of modes of a driving force characteristic generated by the power train in response to an accelerator operation, the vehicle driving-force control device comprising:
   an automatic downshift control unit for automatically changing a current gear stage to a lower gear stage in the manual shift mode having been selected if an input speed of the automatic transmission is lower than or equal to a preset kick-down allowable speed and if an accelerator pedal depression amount reached by a driver is larger than or equal to a preset kick-down allowable depression amount;
   wherein the automatic downshift control unit has a different value of the kick-down allowable speed for each of the driving force characteristic modes.

2. The vehicle driving-force control device according to claim 1, wherein the kick-down allowable speed is set lower for one of the driving force characteristic modes having higher responsiveness to an accelerator operation.

3. The vehicle driving-force control device according to claim 2, wherein the kick-down allowable speed is set to zero for one of the driving force characteristic modes having the highest responsiveness to the accelerator operation.

4. The vehicle driving-force control device according to claim 1, wherein the automatic downshift control unit has a different value of the kick-down allowable depression amount for each of the driving force characteristic modes, and the kick-down allowable depression amount is set greater for one of the driving force characteristic modes having higher responsiveness to the accelerator operation.

5. The vehicle driving vehicle force control device according to claim 1, wherein the automatic downshift control unit prohibits the automatic shifting in the case where an accelerator pedal depression speed reached by the driver is lower than a preset kick-down allowable pedal depression speed before the accelerator pedal depression amount reaches the kick-down allowable pedal depression amount, even if the input speed of the automatic transmission is lower than or equal to the kick-down allowable speed and the accelerator pedal depression amount is larger than or equal to the kick-down allowable depression amount.

6. The vehicle driving-force control device according to claim 5, wherein the kick-down allowable depression speed is set higher for one of the driving force characteristic modes having higher responsiveness to an accelerator operation.

7. The vehicle driving-force control device according to claim 1, wherein the kick-down allowable speed is set higher for one of the driving force characteristic modes having higher responsiveness to an accelerator operation.

8. The vehicle driving-force control device according to claim 1, wherein the kick-down allowable speed is set to zero for one of the driving force characteristic modes having higher responsiveness to an accelerator operation.

9. The vehicle driving-force control device according to claim 7, wherein the kick-down allowable speed is set to zero for one of the driving force characteristic modes having higher responsiveness to an accelerator operation.

10. The vehicle driving-force control device according to claim 1, wherein the kick-down allowable pedal pressing depth is distinctively set to the automatic downshift control means for each of the driving force characteristic modes, and the kick-down allowable pedal pressing depth is set smaller as the responsiveness to an accelerator operation in the driving force characteristic mode is higher.

11. The vehicle driving-force control device according to claim 7, wherein the kick-down allowable pedal pressing depth is distinctively set to the automatic downshift control means for each of the driving force characteristic modes, and the kick-down allowable pedal pressing depth is set smaller as the responsiveness to an accelerator operation in the driving force characteristic mode is higher.

12. The vehicle driving-force control device according to claim 1, wherein the automatic downshift control unit prohibits the automatic shifting in the case the accelerator pedal depression speed reached by the driver is lower than or equal to the preset kick-down allowable pedal depression speed before the accelerator pedal depression amount reaches the kick-down allowable depression amount, even if the input speed of the automatic transmission is lower than or equal to the kick-down allowable speed and the accelerator pedal depression amount is larger than or equal to the kick-down allowable depression amount.

13. The vehicle driving-force control device according to claim 5, wherein the automatic downshift control unit prohibits the automatic shifting in the case the accelerator pedal depression speed reached by the driver is lower than or equal to the preset kick-down allowable pedal depression speed before the accelerator pedal depression amount reaches the kick-down allowable depression amount, even if the input speed of the automatic transmission is lower than or equal to the kick-down allowable speed and the accelerator pedal depression amount is larger than or equal to the kick-down allowable depression amount.

14. The vehicle driving-force control device according to claim 12, wherein the kick-down allowable depression speed is set lower for one of the driving force characteristic modes having higher responsiveness to an accelerator operation.

15. The vehicle driving-force control device according to claim 13, wherein the kick-down allowable depression speed is set lower for one of the driving force characteristic modes having higher responsiveness to an accelerator operation.

16. The driving-force control device according to claim 1, wherein the manual shift mode is a steady manual shift mode that is maintained until a driver's operation to change to the automatic shift mode is performed after a driver's operation to change to the manual shift mode is performed.

17. The vehicle driving-force control device according to claim 1, wherein the manual shift mode is a temporary manual shift mode that automatically returns to the automatic shift mode if a preset returning condition is satisfied after a driver's operation to change to the manual shift mode is performed.

* * * * *